(12) United States Patent
McGrath et al.

(10) Patent No.: US 7,533,346 B2
(45) Date of Patent: May 12, 2009

(54) INTERACTIVE SPATIALIZED AUDIOVISUAL SYSTEM

(75) Inventors: David S. McGrath, Rose Bay (AU); Daniel Heckenberg, Newtown (AU); Stephen James Bennett, San Francisco, CA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 362 days.

(21) Appl. No.: 10/500,902

(22) PCT Filed: Jan. 9, 2003

(86) PCT No.: PCT/AU03/00019

§ 371 (c)(1),
(2), (4) Date: May 19, 2006

(87) PCT Pub. No.: WO03/058473

PCT Pub. Date: Jul. 17, 2003

(65) Prior Publication Data

US 2006/0212147 A1    Sep. 21, 2006

(30) Foreign Application Priority Data

Jan. 9, 2002    (AU) .................................... PR 9898

(51) Int. Cl.
*G06F 17/00* (2006.01)
*H04R 5/02* (2006.01)
*H04R 5/00* (2006.01)

(52) U.S. Cl. ........................................ 715/757; 715/758

(58) Field of Classification Search ................. 715/753, 715/757, 758
See application file for complete search history.

(56) References Cited

U.S. PATENT DOCUMENTS 5,347,306 A    9/1994  Nitta ........................... 348/15

(Continued)

FOREIGN PATENT DOCUMENTS

EP    0 696 018 A2    2/1996

(Continued)

OTHER PUBLICATIONS

Office Action to Japanese Application 2003-558716, dispatched Oct. 2, 2007 and English translation thereof.

(Continued)

*Primary Examiner*—Doug Hutton
*Assistant Examiner*—Daeho D Song
(74) *Attorney, Agent, or Firm*—Dov Rosenfeld; Inventek

(57) ABSTRACT

An interactive spatialized audiovisual system links a plurality of remote used terminals. The system comprises a networked computer having an associated user database including user status information. Input means are provided at the computer for receiving a plurality of audio streams and associated locating data from the remote user terminals for, virtually locating the users relative to one another within a virtual user environment such as a chat room environment Selection means are provided for enabling selection of at least the first group of the audio streams in a first selection process based on status information in the user database. Output means output the selected group of audio streams and associated locating data for spatialization of the audio streams relative to a first listener-based audio reference frame which is substantially coherent with visual representations of the audio sources defined by the locating data at the first user terminal. Merging means are provided for merging at least some of the audio streams into a merged audio stream for transmittal to the first and other user terminal, with the merged audio stream being spatialized so as to provide for a spatialized background audio effect in the audio reference frame at the user terminal.

37 Claims, 11 Drawing Sheets

U.S. PATENT DOCUMENTS

| | | | |
|---|---|---|---|
| 5,889,843 A | 3/1999 | Singer et al. | 379/202 |
| 5,950,202 A | 9/1999 | Durward et al. | 707/10 |
| 6,011,851 A | 1/2000 | Connor et al. | 381/17 |
| 6,021,206 A | 2/2000 | McGrath | 381/310 |
| 6,125,115 A | 9/2000 | Smits | 370/389 |
| 6,241,612 B1 | 6/2001 | Heredia | 463/42 |
| 6,323,857 B1 | 11/2001 | Mielekamp et al. | 345/419 |
| 7,346,654 B1* | 3/2008 | Weiss | 709/204 |
| 2002/0013813 A1 | 1/2002 | Matsuoka | 709/204 |
| 2003/0063574 A1* | 4/2003 | Virolainen | 370/260 |
| 2003/0081115 A1* | 5/2003 | Curry et al. | 348/14.12 |

FOREIGN PATENT DOCUMENTS

| | | |
|---|---|---|
| GB | 2 303 516 A | 2/1997 |
| GB | 2 349 055 A | 10/2000 |
| JP | H06006471 | 1/1994 |
| JP | H06149275 | 5/1994 |
| JP | H08125738 | 5/1996 |
| JP | H08186648 | 7/1996 |
| JP | H09023275 | 1/1997 |
| JP | H09034868 | 2/1997 |
| JP | 2001308855 | 11/2001 |
| WO | WO 99/53673 | 10/1999 |
| WO | WO 00/48379 | 8/2000 |

OTHER PUBLICATIONS

Office Action to Japanese Application 2003-558716, dispatched May 27, 2008 and English translation thereof.

* cited by examiner

INTERACTIVE SPATALIZED AUDIOVISUAL SYSTEM

FIELD OF THE INVENTION

The present invention relates to an interactive spatialized audiovisual system for conducting chat room type conversations in a three dimensional audio environment.

BACKGROUND OF THE INVENTION

Recently, chat rooms have become a very popular forum for intercommunication over the Internet. Normally, these chat rooms involve users typing in information using a computer type device interconnected to a computer network such as the Internet.

The use of chat rooms allows for an increased level of personal intercommunication and on-line discussion. Normally, the chat room may be discussion topic based.

Conventional chat programs provide a text input-based chat environment. Participants can either choose to chat with an individual, or within a group. A messaging service is also provided to enable short messages of limited length to be sent between two parties. This online program has proved itself to be very popular over time and has gained many users.

Unfortunately, the chat room scenario has a number of drawbacks. These include the need to type information on a keyboard type device for entering to the chat room. Typing is often a laborious and non-spontaneous process when compared merely to the process of talking. Further, chat room conversations can often become confusingly intermingled, and it is accordingly difficult to keep track of multiple participants in a particular discussion.

SUMMARY OF THE INVENTION

According to a first aspect of the invention there is provided an interactive spatialized audiovisual system for linking a plurality of remote user terminals, the system comprising:
   a networked computer;
   an associated user database including user status information;
   input means for receiving at the computer a plurality of audio streams and associated locating data from the remote user terminals for virtually locating the users relative to one another within a virtual user environment;
   selection means for enabling selection of at least a first group of the audio streams in a first selection process based on status information in the user database;
   output means for outputting the selected group of audio streams and associated locating data for spatialization of the selected group of audio streams relative to a first listener-based audio reference frame which is substantially coherent with visual representations of the audio sources defined by the locating data at a first user terminal.

Conveniently, the system includes first spatialization means for spatializing the selected group of audio streams.

Preferably, the system includes merging means for merging at least some of the audio streams into a merged audio stream for transmittal to the user terminal, and second spatializing means for spatializing the merged stream so as to provide for a background audio effect in the audio reference frame at the user terminal.

Conveniently, the selection means are arranged to select different groups of audio streams according to different selection processes based on the user status information in the user database, for transmission to the corresponding user terminals.

The user status information typically includes user location data for locating the user in the virtual environment, user orientation data for orientating the user both with respect to the other users and to the virtual environment, user listening status information and user talking status information.

The user listening status information is arranged to allow the user to listen to other selected users or groups in the environment.

The user listener status may be based on at least one of the following:
   the selection of M closest audio sources from N audio sources;
   the selection of M loudest sources based on the amplitude of the source signal and/or the distance of the source from the listener;
   a user-driven selection process determined by the subject user or other users;
   a moderator-driven selection process in which a "moderator" in the environment is able to control the talk and listen status of the other users;
   the geography or topology of the virtual environment, in which barriers and openings such as walls and doorways and other features of the environment are arranged realistically to affect the listening capability of a particular user;
   the creation of temporary "soundproof" barriers around user groups.

The barriers may define one or more chat rooms, with at least some of the audio streams in a particular room being summed or merged and spatialized to achieve a background reverberation effect characteristic of that particular room.

The audio streams in adjoining rooms or areas may also be merged and spatialized to create "threshold" effects at entrance/exit points.

"Dry" and "wet" room signals may be respectively be generated using summed non-reverberated audio sources and audio sources which have been summed and reverberated.

In general terms, the invention seeks to provide a virtual environment in which there is a measure of coherence between the visible and audible effects within the virtual environment.

Typically, the user database utilizes a plurality of different selection criteria based on the status of the particular user to whom the selected audio streams and associated locating information is being transmitted.

Conveniently, the first spatialization means are provided at each of the user terminals for processing of selected groups of audio streams from the networked computer.

Alternatively, the first spatialization means are arranged to process selected groups of audio streams at the networked computer to derive spatialized audio streams for onward transmission to at least the first selected user terminal.

In one form of the invention, the second spatializing means are arranged to process the merged group of audio streams at the networked computer to derive a spatialized merged audio stream for onward transmission to at least the first selected user terminal.

Alternatively, the second spatialization means are provided at each of the user terminals for spatializing merged groups of audio streams at each user terminal.

Typically, the second spatialization means includes a binaural reverberation processor.

The invention extends to a method of providing an interactive spatialized audio facility comprising:

receiving from a plurality of user-based audio sources a plurality of corresponding audio streams and associated locating data capable of virtually locating the audio sources relative to one another within a virtual environment;

determining user status data;

selecting at least some of the audio streams based on the user status data;

transmitting the locating data and selected audio streams to a first listener destination for enabling the display of visual representations of the virtual locations of at least some of the audio sources within the virtual environment, and spatializing the selected audio streams relative to a first listener-based audio reference frame which is substantially coherent with the visual representations of the audio sources either before or after the audio streams are transmitted to the first listener destination.

Preferably, the method includes:

enabling the user status data to be altered, reading the altered user status data, and selecting at least one of the audio streams based on the altered user status data, wherein at least one of the audio streams selected using the altered user status data is different to the prior selected streams.

Conveniently, the method includes the steps of:

merging at least some of the audio streams, transmitting the merged audio streams to the first listener destination, and spatializing at the first listener destination the merged audio streams so as to provide a background audio effect within the virtual environment.

The merged audio stream may include audio streams which have not been individually selected.

The invention extends to a method of providing an interactive spatialized audiovisual facility comprising:

receiving from a plurality of user-based audio sources a plurality of corresponding audio streams and associated locating data capable of virtually locating the audio sources relative to one another within a virtual environment;

determining user status data;

selecting at least some of the audio streams based on the user status data in a first selection process;

transmitting the selected audio streams and associated locating data to a first listener destination for enabling the display of visual representations of the virtual locations of at least some of the selected audio sources within the virtual environment;

spatializing the selected audio streams relative to a first listener-based audio reference frame which is substantially coherent with the visual representations of the audio sources either before or after the transmitting said streams;

selecting at least some of the audio streams in a second selection process; and transmitting the selected audio streams and associated locating information to a second listener destination for enabling the display of visual representations of the locations of at least the selected audio sources, and spatializing at the second listener destination the selected audio streams in an audio reference frame which is substantially coherent with the visual representations of the audio sources, either before or after transmitting said streams.

In accordance with a further aspect of the present invention, there is provided a system for providing for spatialized conversation over a network environment, the system comprising:

at least one user terminal;

a computer network capable of streaming audio streams to the user terminals, each of the audio streams including associated spatialization information;

a rendering system for rendering the audio streams to predetermined virtual locations around a user; and a user interface for virtually spatially locating a user amongst the audio streams;

wherein the rendering system spatializes the audio streams so as to maintain a substantially spatially coherent audio reference frame around the user, the user interface includes a visual indicator of the spatial position of each of the audio streams around a listener and the rendering system substantially maintains a spatially coherent audio reference frame relative to the visual indicator.

Each stream preferably includes user ownership information and the system preferably includes audio stream access interface for granting access to the audio streams.

The rendering system can attenuate audio sources located virtually remotely from a current user and merge audio sources located virtually remotely from a current user. In one embodiment the rendering system can be located adjacent a user and the audio sources are preferably streamed over a computer network.

In one form of the invention, multiple selection processes are used to select the audio streams according to at least one predetermined algorithm, the selected audio streams and associated locating information are transmitted to multiple listener destinations, and visible representations of the locations of at least the selected audio sources are displayed at the multiple listener destinations, with each of the selected audio streams being spatialized at the multiple listener destinations in audio reference frames which are substantially coherent with the visible representations of the audio sources.

The invention further provides a computer-readable medium having stored thereon executable instructions for causing a computer to provide an interactive spatialized audiovisual facility, the instructions being arranged to:

receive from a plurality of user-based audio sources a plurality of corresponding audio streams and associated locating data capable of virtually locating the audio sources relative to one another within a virtual environment;

determine user status data;

select at least some of the audio streams based on the user status data;

transmit the locating data and selected audio streams and associated to a first listener destination for enabling the display of visual representations of the virtual, locations of at least some of the audio sources within the virtual environment, and spatialize the selected audio streams relative to a first listener-based audio reference frame which is substantially coherent with the visual representations of the audio sources.

The invention still further provides a computer-readable medium having stored thereon executable instructions for causing a computer to provide an interactive spatialized audiovisual facility, the instructions being arranged to:

receive from a plurality of user-based audio sources a plurality of corresponding audio streams and associated locating data capable of virtually locating the audio sources relative to one another within a virtual environment;

determine user status data;

select at least some of the audio streams based on the user status data in a first selection process;

transmit the selected audio streams and associated locating data to a first listener destination for enabling the display of visual representations of the virtual locations of at least some of the selected audio sources within the virtual environment;

spatialize the selected audio streams relative to a first listener-based audio reference frame which is substantially coherent with the visual representations of the audio sources;

select at least some of the audio streams in a second selection process; and transmit the selected audio streams and associated locating information to a second listener destination for enabling the display of visual representations of the locations of at least the selected audio sources, and spatializing at the second listener destination the selected audio streams in an audio reference frame which is substantially coherent with the visual representations of the audio sources.

According to a yet further aspect of the invention, there is provided a method of operating an interactive spatialized audio facility including a networked computer and a plurality of user terminals linked to the networked computer, the method comprising:

transmitting from a user terminal to the networked computer an audio stream generated by the user and associated locating data capable of virtually locating the audio stream generated by the user within a virtual environment for selective combination with corresponding audio streams, associated locating data and user status data at the networked computer;

receiving at the user terminal a plurality of audio streams selected on the basis of the user status data and associated locating data for virtually locating the users relative to one another within a virtual user environment;

generating at the user terminal visual representations of the locating data, and spatializing the selected group of audio streams relative to a user based audio reference frame which is substantially coherent with the visual representations of the audio sources of the users as defined by the locating data for playback to the user.

Conveniently, the method includes receiving at the user terminal a merged audio stream which is spatialized before or after receipt thereof to provide a spatialized background audio effect in the audio reference frame at the user terminal for playback to the user.

The invention extends to a computer-readable medium having stored thereon executable instructions for causing a computer to provide or operate an interactive spatialized audiovisual facility, the instructions including program segments arranged to implement any one of the methods set out above.

BRIEF DESCRIPTION OF THE DRAWINGS

Notwithstanding any other forms which may fall within the scope of the present invention, preferred forms of the invention will now be described, by way of example only, with reference to the accompanying drawings in which.

DETAILED DESCRIPTION OF THE EMBODIMENTS

In the preferred embodiment, there is provided a chat room facility which includes audio spatialization and rendering technologies to provide for a spatialized form of audio chat room. The preferred embodiment can be implemented via suitable C++ programming of standard high end personal computer equipment.

Figure 1:
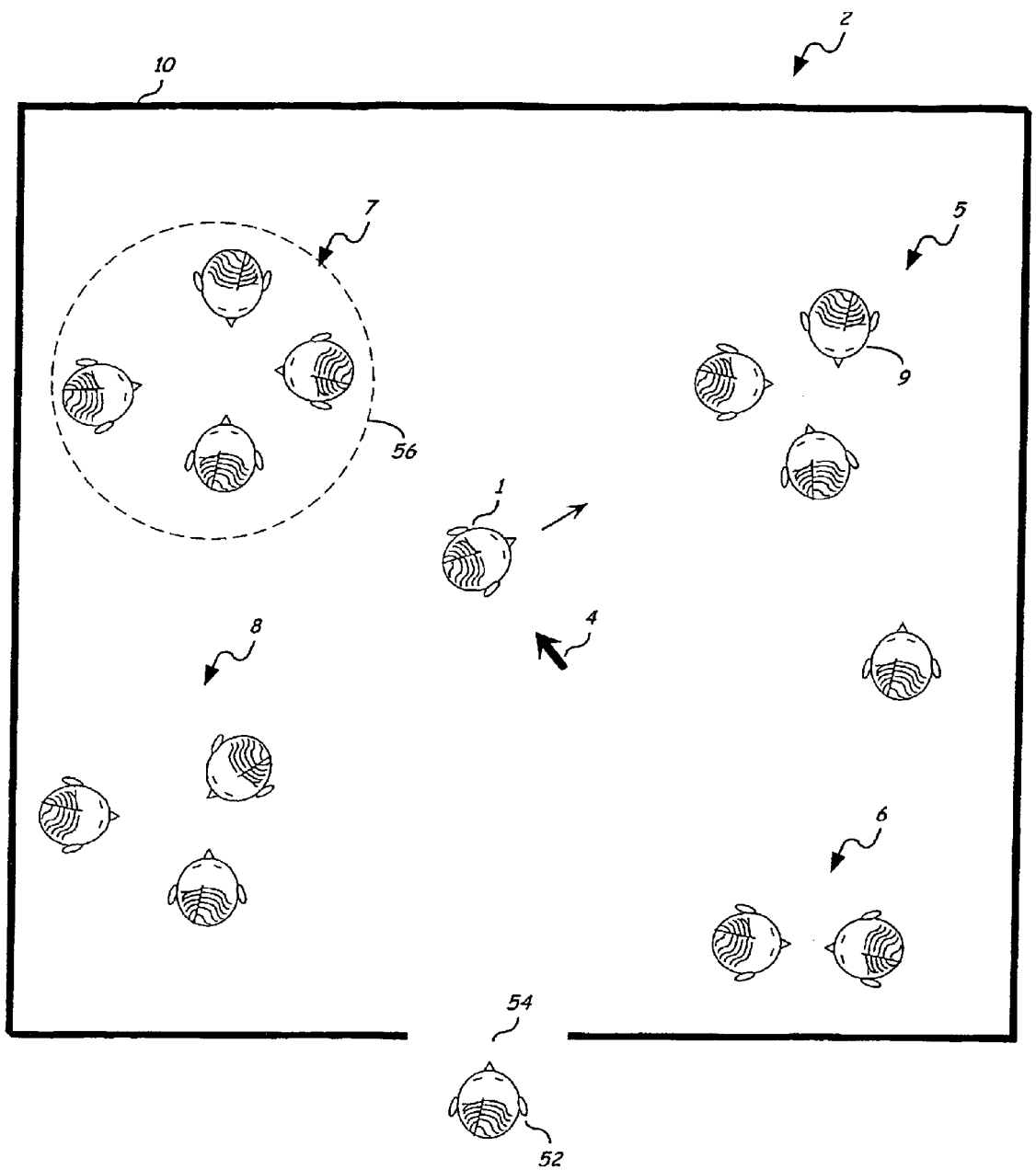
FIG. 1 illustrates schematically a first embodiment of a user interface for an audio chat room of the preferred embodiment.

Turning now to FIG. 1, there is illustrated an example of a user using the interface screen for utilization with a first embodiment of the invention.

A user 1 enters a virtual chat room which comprises a two dimensional array 2 on the user's screen. The chat room in this particular case is one dealing with the "LINUX" operating system. The chat room consists of a number of groups 5, 6, 7 and 8 of users 9 discussing various topics. The user interface includes a mouse pointer 4 which can be utilised in conjunction with a mouse to grab the user 1 and move the user towards different groups such as group 5 and further orient the user relative to the group. The user 1 is equipped with a set of headphones and, as the user approaches the group 5, the conversation of that group initially appears in the distance and the conversation comes closer to the individual. Further, the conversation can be spatialized such that the conversations of the group 5 appear on the left hand side of the user 1 and the conversations of the group 6 appear on the right hand side of the user. The user is equipped with a microphone and, as a result, can thereby contribute to the conversation. Further, alternative audio inputs such as music tracks can be provided for the other listeners in the environment.

Each listener in the virtual environment is provided with a similar screen with a clearly identified current position locater. Listeners move around in the space defined by the "wall" 10 of the chat room listening to various conversations and contributing to the conversations. Each member of the chat room is able to take part in localised spatialized conversations with other members.

Figure 2:
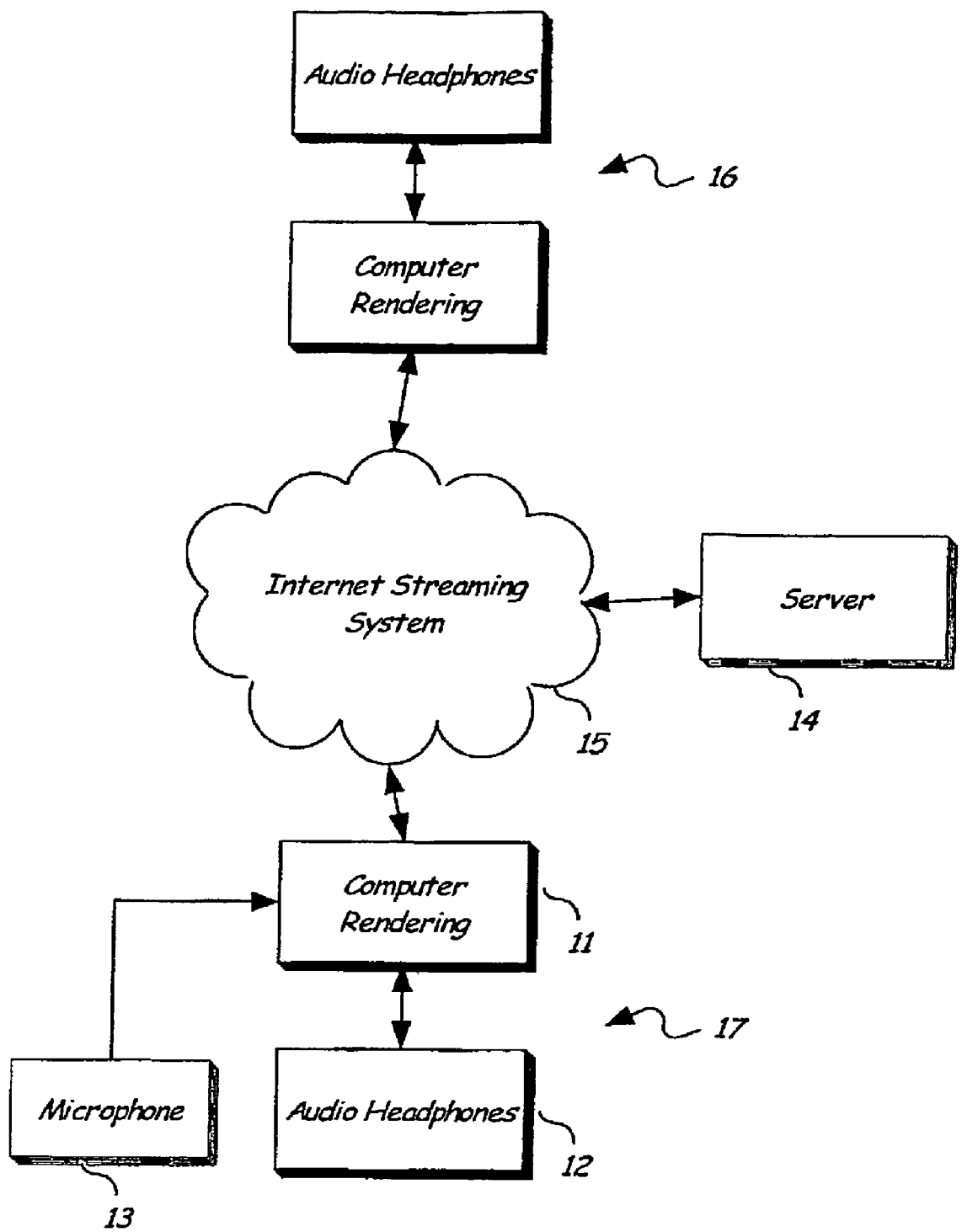
FIG. 2 illustrates schematically a streaming environment of the first embodiment.

Turning now to FIG. 2, there is illustrated schematically a basic implementation of the arrangement of FIG. 1. The system can be based around a personal computer 11 having sound card processing capabilities so as to provide for output audio over headphones 12 in addition to a microphone input 13. The rendering computer 11 is interconnected with a streaming server 14 which streams the audio channels of each participant over a streaming network which is in this case the Internet 15. A series of other users 16 are similarly interconnected to the streaming server 14 which streams audio dialogue in addition to dialogue position information. The audio dialogue of the user 17 is also forwarded back to the server 14 for streaming to each participant.

Figure 3:
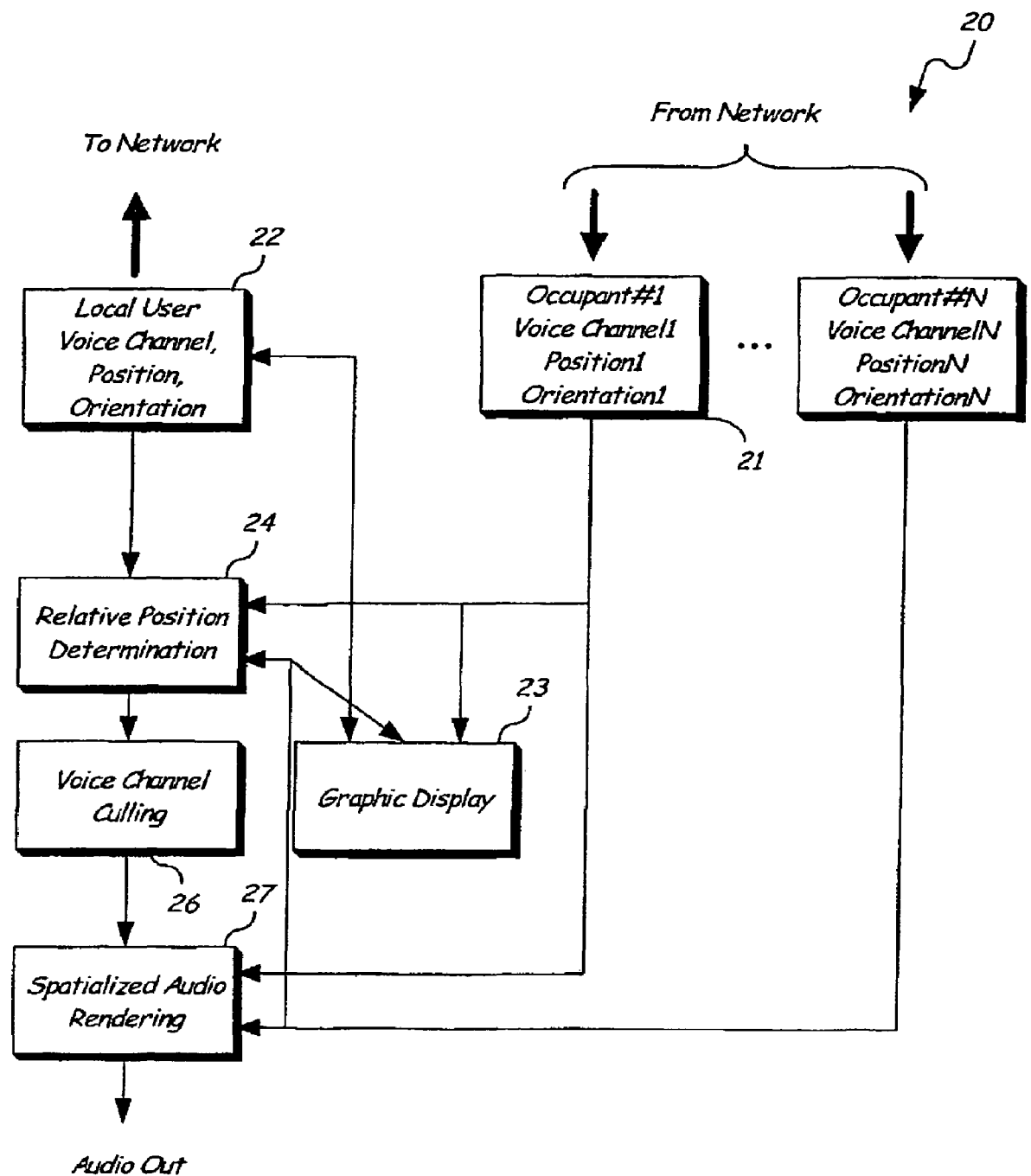
FIG. 3 illustrates a schematic flowchart showing the operation of a rendering computer of the first embodiment.

The rendering computer can therefore operate as illustrated in FIG. 3. From the network stream 20 there is provided a series of chat room occupant streams 21. Each chat room occupant stream contains a voice channel and the position and orientation of the user of the voice channel. Similarly, output 22 from the rendering computer is the local user's voice channel and associated positional information. The position and orientation information is utilised to update a display 23 so as to update the current position and orientation of each individual. The position information is also forwarded to relative position determination unit 24 for determining a current position of each listener relative to the current listener.

The relative position determination output is forwarded to an optional voice channel culling unit 26. Voices that are attenuated with distance may be culled in accordance with the preset preferences. Additionally, a group or cluster of distant voices can be combined into a single voice or quasi-voice via superposition of the voice channels. The utilization of culling and combining operates to reduce the number of voice channels that must be subjected to spatialized audio rendering 27.

The spatialized audio rendering takes the voice channel inputs in addition to the relative location information and culling information and utilises techniques for spatialization to place the voices around a listener at predetermined locations.

Suitable techniques for spatialization include those disclosed in PCT publication no. WO99/49574 entitled "Audio Signal Processing Method and Apparatus", filed 6 Jan. 1999 and assigned to the present applicant, the contents of which are specifically incorporated by cross reference. The spatialization techniques disclosed allow a voice to be located relative to a headphone listener. Each of the input audio channels can be separately spatialized or can be first rendered to a standard reference frame such as a Dolby® Surround Sound five channel reference frame and then rotated to an absolute reference frame before a final rotation to the relative reference frame of the listener. The signals are combined and then output to the listener.

The spatialized conversation system can also be combined with binaural rendering technologies to provide for fully immersive behaviour. For example, U.S. Standard application Ser. No. 08/893,848 which claims priority from Australian Provisional Application No. PO0996, both contents of which are specifically incorporated by cross reference, discloses a system for rendering a B-formatted sound source in a head tracked environment at a particular location relative to a listener. Hence, if the audio tracks are stored in a B-format then such a system, suitably adapted, can be used to render the audio tracks. One example of where such a system is suitable is where the B-format part of the rendering is to be done centrally, and the headtracking part (which is applied to the B-format signal to generate a headphone signal) is done locally. B-field calculation can be expensive and is best done centrally. Central computation incurs communication delays, and this has the effect of introducing latency in position, which is not too detrimental. Headtracking is done locally because this is very sensitive to latency.

PCT publication no. WO99/51063 discloses an alternative system for Headtracked Processing for headtracked playback of audio in particular in the presence of head movements. Such a system could be used as the rendering engine by rendering the audio track to a predetermined format (e.g. Dolby™ 5.1 channel surround) so as to have a predetermined location relative to a listener, and, in turn, utilising the system described in the PCT application to then provide for the localisation of an audio signal in the presence of head movements.

Various user interface modifications to the preferred embodiment are also possible. For example, an announcer audio channel can also be provided which provides a "godlike" voice which announces the entrance and exit of users. A joystick or mouse can be provided so that a user can "walk" around the environment. Other users can have a choice of accepting or declining chat requests.

Hence, in the above embodiment, users conduct their conversation/chat sessions in the conventional way—through speech. The user wears a set of headphones with a transmitter attached which communicates with a receiver connected to a phone line, establishing the Internet online connection. As new users log onto the chat program, or so-called 'chatrooms', they receive a voice announcement of the existing users in the room and their details. The display also shows where the user is located with respect to all other existing users in the chat room. The user can 'move' around the room (located on the display) and can walk up to any users in trying to set up an individual conversation. In one form of the embodiment all users have a choice of accepting or declining chat requests.

Figure 4:
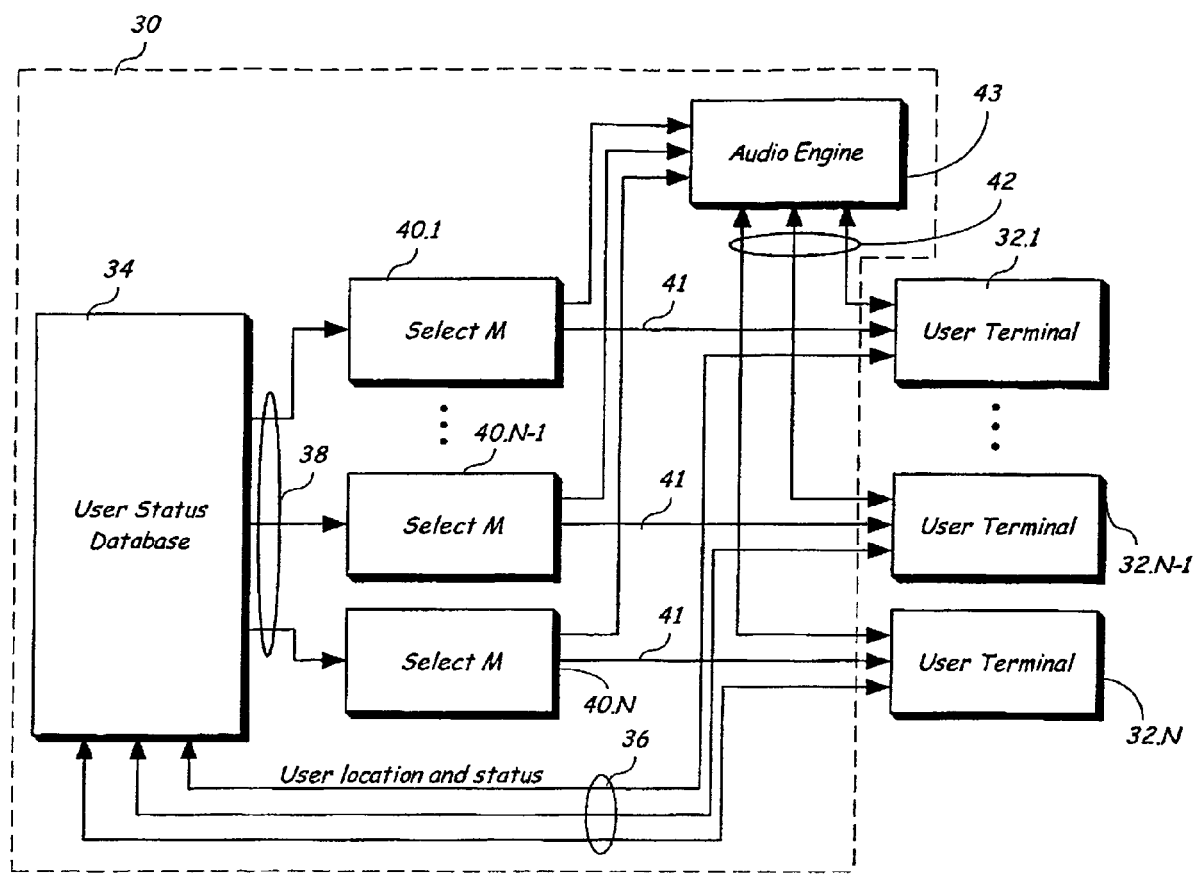
FIG. 4 illustrates a highly schematic functional block diagram of a second embodiment of a spatialized audio conversation system of the invention.

Referring now to FIG. 4, a streaming server 30 is shown connected via the internet to a number of user terminals 32.1 to 32.N. The streaming server incorporates a user status database 34 which is typically SQL-based. The user status database is constantly updated with user location and status information via inputs 36 from each of the user terminals 32.1 to 32.N. The user location data includes the position and orientation of each user both with respect to the other users and to the chat room(s) within the chat room environment. The status information includes the particular status of the user at a particular time. For example, the user may have various categories of listener status allowing the user to listen to other selected users or groups in the chat room. Similarly, the talk status of the user may be altered from the lowest "mute" status to, say, a highest "voice of god", "soapbox" or "moderator" status in which that particular user may be in a position, respectively, to talk at will, to broadcast a message or speech throughout the chat room environment, or to control the talk and listen statuses of other users within the chat room environment. Multiple outputs 38 from the user status database lead to multiplexer-type select M functions 40.1 to 40.N connected to the respective user terminals 32.1 to 32.N via user location and status inputs 41 and via audio inputs 42 through an audio engine 43.

The operation of the audio component of the streaming server will now be described in more detail with reference to FIG. 5. In the server, an audio bus 44 is provided comprising all of the audio channels of the N users. Each of the channels, such as those indicated at 44.1 and 44.2, have corresponding audio or microphone inputs 46.1 and 46.2. Outputs 48.1 to 48.N from each of the lines in the audio bus 44.N are fed into the select M fictions 40.1 to 40.N. M output audio channels 50 are fed from the select M functions to each of the user terminals 32.1-32.N of FIG. 4. There are various different methods or algorithms that can be used to control exactly which audio channels are selected for a particular user. Two of the main control criteria are the manner in which the user or listener obtains permission to enter a chat room, and exactly who gets heard by whom in each chat room.

Typically, a new entrant to the room will go through an approval process prior to being allowed entry. As a result, private conversations can be held between participants in the particular room, safe in the knowledge that new entrants can not "sneak in" without prior notification to the existing participants. The selection process may be autocratic, via a moderator or chairman, or may be democratic, by way of a users' vote. User entry could also be password controlled in the case of a regular chat group.

Referring back to FIG. 1, a new entrant 52 would position himself or herself at the entrance 54 of the virtual chat room 3 appearing on the user interface screen and would request entry into the room, by, say, clicking on a "request entry" icon. One of the processes described above could then take place. As an alternative, a particular group 7 could, by mutual consent, erect a "sound proof" barrier 56 around their conversation. Similar entry criteria would apply if a user was in the room and wanted to join in the discussion.

Once the user 52 has entered the chat room, various other methods can be used to determine exactly who the user or listener will hear. In one version, the M closest sources can be selected from the N sources. Alternatively, the M loudest sources may be selected, where loudness is based on the amplitude of the source signal as well as the distance of the source from the listener.

A moderator, which could be user 1, could also be used to select who is to be heard, on behalf of all listeners in the room. A further variation is that the moderator could select M' sources on behalf of the group, and listener-individualised selection could be used for the remaining M-M' sources.

As far as talking status is concerned, listeners may request permission to speak, by signalling to the moderator 1 their desire. The moderator can then review the "queue" of listeners and select who is to be heard by heard the group. One method of selection could be for each of the prospective talkers to provide a brief textual precis of their proposed contribution. Where there are several groups in the chat room, with several different conversations going on simultaneously, each of the groups 5, 6, 7 and 8 may have a group moderator or chairperson to control the flow of the discussion within a particular group.

Referring back to FIG. 5, all of the audio channels to the audio bus 44 are combined at a summer 58, and the summed signal 60 undergoes a binaural reverberation process, such as the B-format rending process described above with reference to U.S. Ser. No. 08/893,848. The left and right binaural reverberation outputs 64 and 66 effectively form part of the audio bus 44, with left and right summed binaural reverberation inputs 64.1 to 64.N and 66.1 to 66.N being fed to each of the user terminals 32.1 to 32.N.

Figure 6:
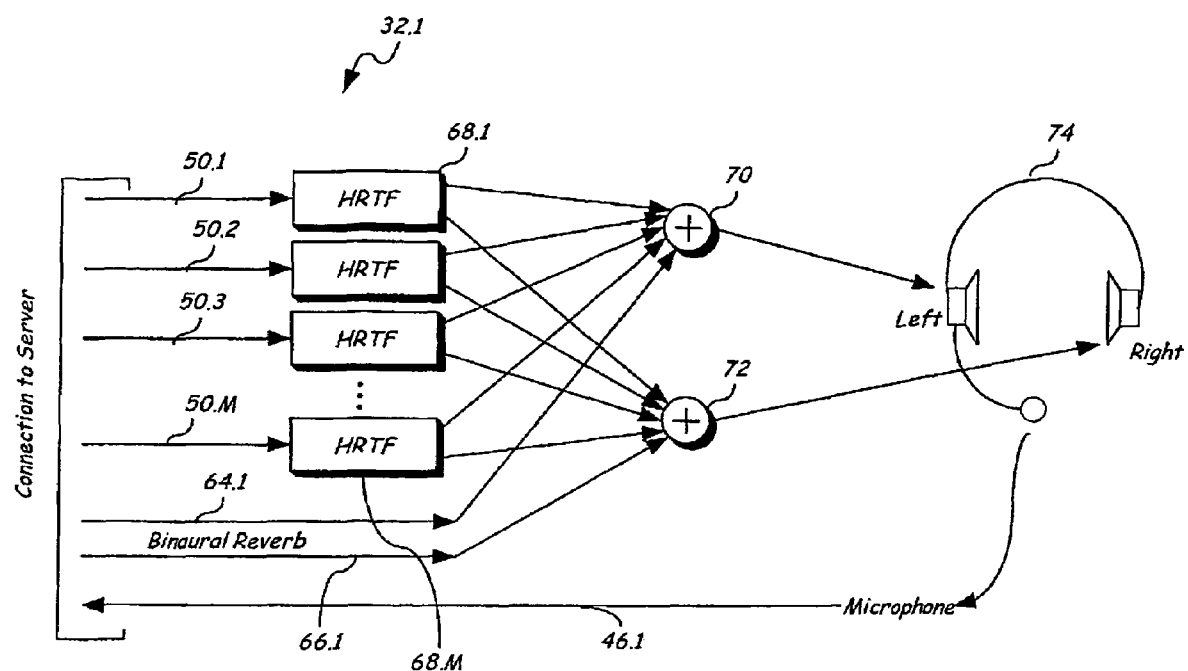
FIG. 6 shows a more detailed functional block diagram of a user terminal adapted to be connected to the streaming server of FIG. 5.

Referring now to FIG. 6, the user terminal 32.1 is shown having M audio channel inputs 50.1 to 50.M which are separately spatalized by binaural rending using HRTF processes 68.1 to 68.M. The binaurally rendered signals are summed at left and right summers 70 and 72 which are fed to the respective left and right earpieces of a set of headphones 74 worn by the user. The left and right binaural reverberation signals 64.1 and 66.1 are also fed to the respective left and right summers 70 and 72. The summed binaural reverberation signals 64.1 and 66.1 produce background reverberation which allows the user to experience not only, say, the three or four closest voices in the room, but also the background hubbub representative of all of the summed voices in the chat room environment. This makes for an audio experience which is far more realistic without requiring an inordinate number of input audio channels.

Figure 5:
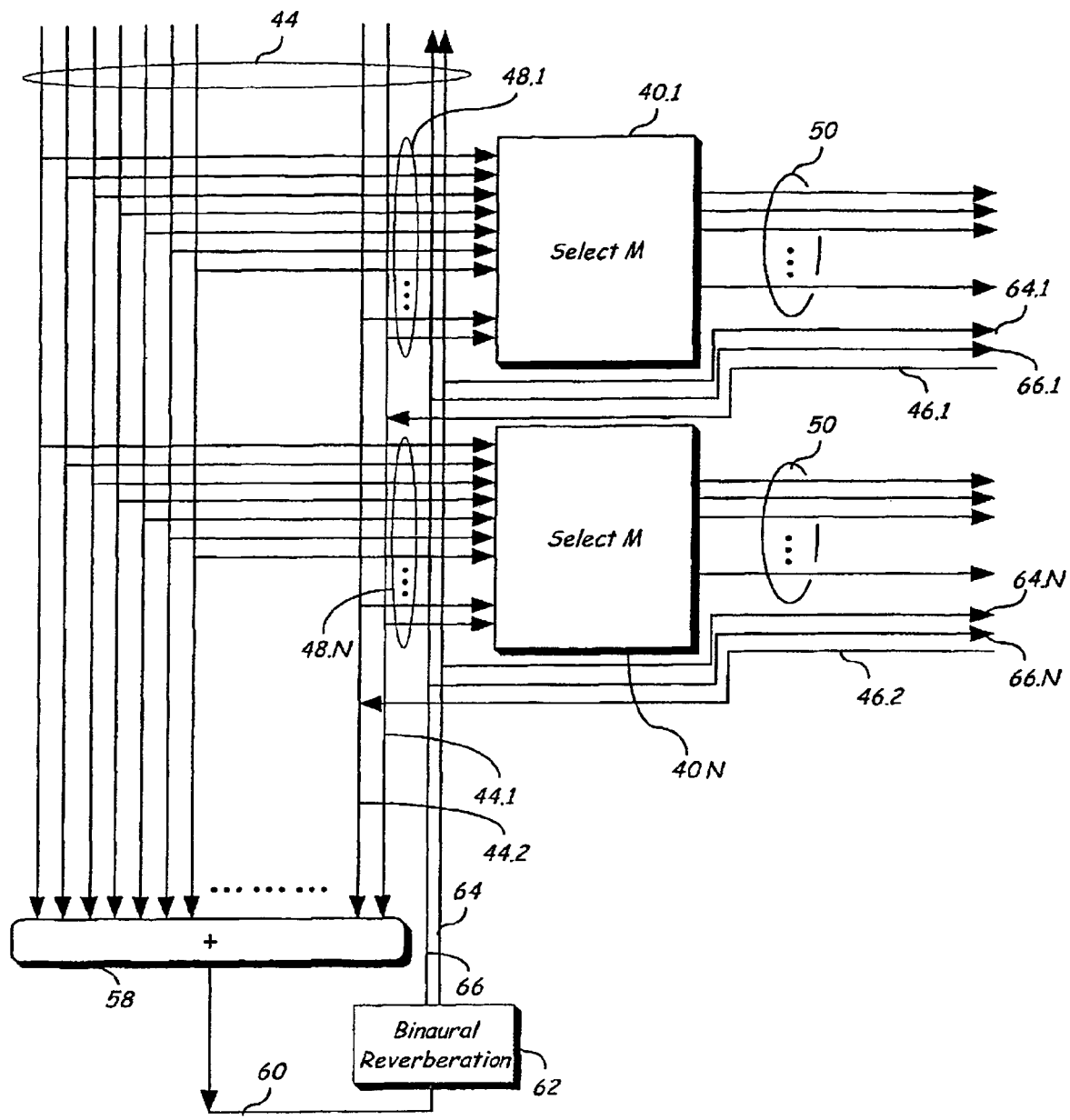
FIG. 5 shows a more detailed functional block diagram of an audio component of a streaming server.

In the embodiment of FIGS. 5 and 6, the bulk of the digital signal processing and channel selecting occurs at the streaming server, to the extent that the audio signal processing functions illustrated in FIG. 6 can be incorporated into the right and left earpieces of the headphone 74, which is in turn connected to the rendering computer. The rendering computer in turn incorporates the visual user interface, providing user location and status information to update the user status database 34. It also receives the updated user location and status information from the demultiplexer function 40.1 to 40.N so that the user interface screen can be constantly updated with the whereabouts and statuses of the other users in the chat room.

Figure 7:
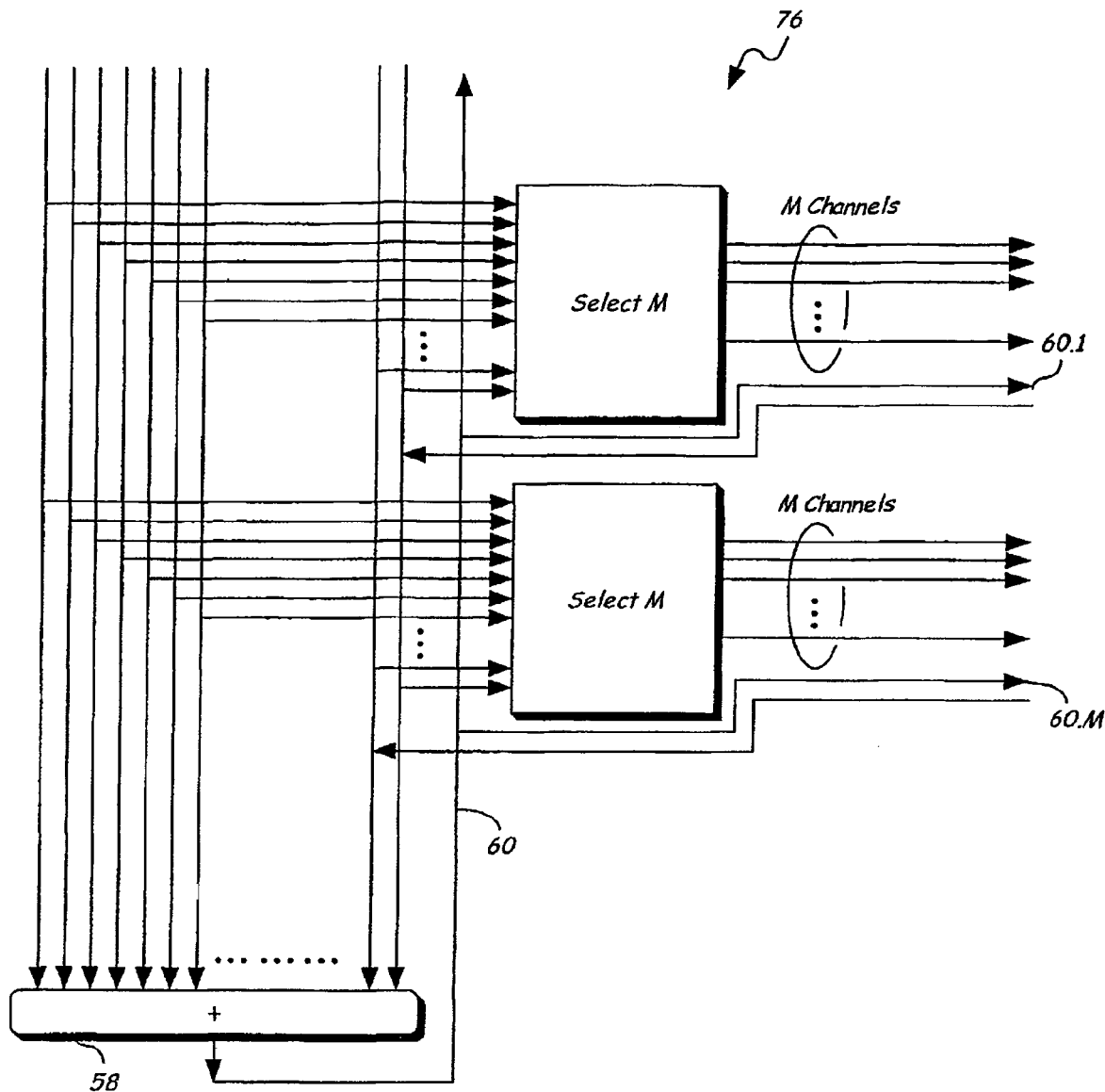
FIG. 7 shows a more detailed block diagram of a second embodiment of an audio component of a streaming server.
Figure 8:
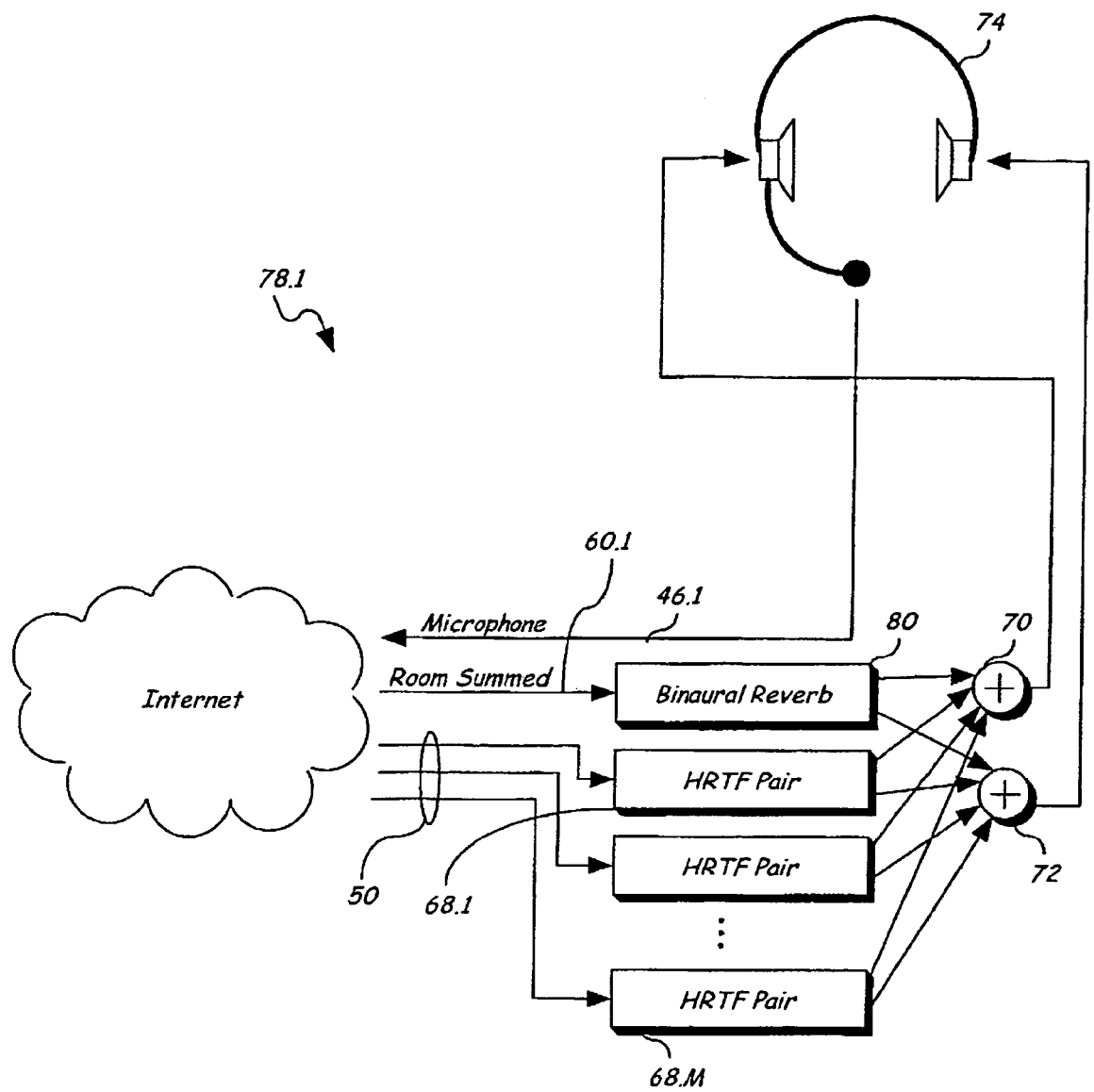
FIG. 8 shows a functional block diagram of a second embodiment of a user terminal adapted to be connected to the streaming server of FIG. 7.

Referring now to FIG. 7, a second embodiment of an audio component of a streaming server 76 is shown which is similar to the first embodiment, save that the binaural reverberation function has been removed. Instead, the summed output signal 60 from the summer 58 is fed as an unprocessed summed input signal 60.1 to 60.M to each of the user terminals, one of which is shown at 78.1 in FIG. 8. The binaural reverberation function 80 of the summed signal 60.1 takes place at the user end either within the rendering computer or within the headphones 74, together with the HRTF functions 68.1 to 68.M. In this way, the number of input channels is reduced, at the expense of additional processing power at the user end.

Figure 9:
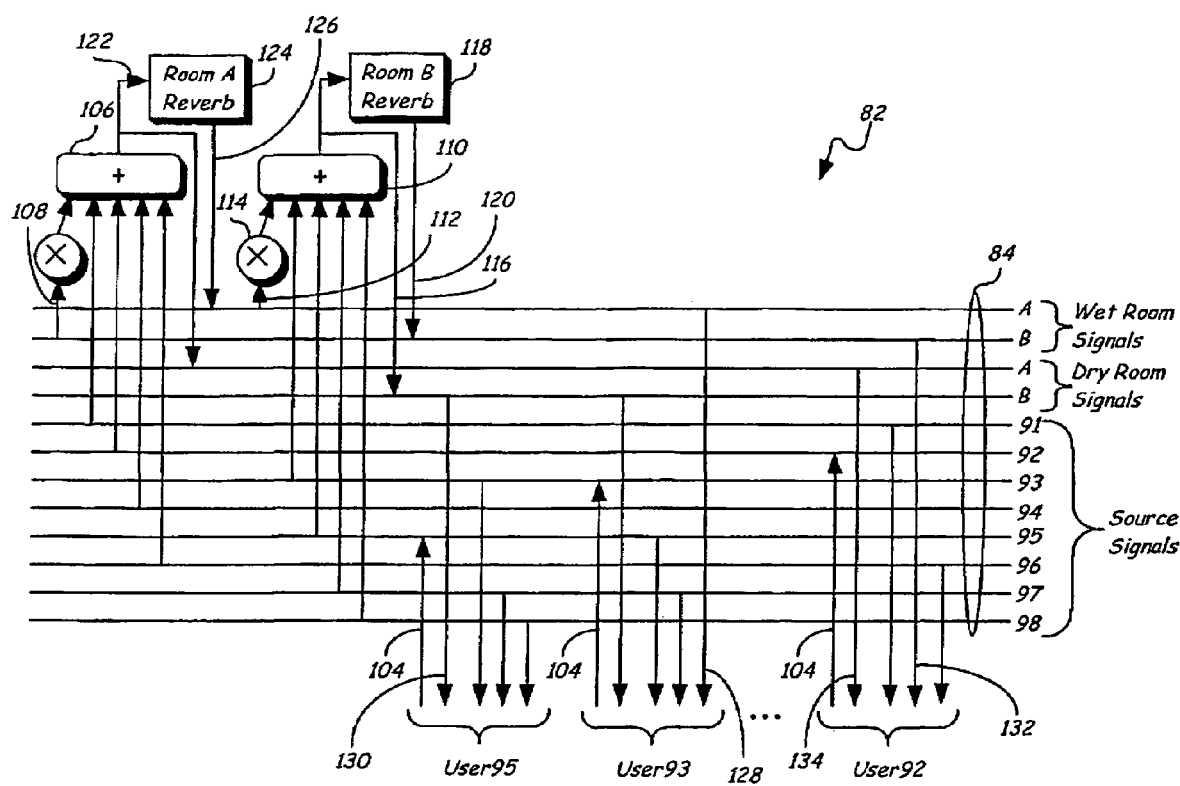
FIG. 9 shows a functional block diagram of an audio component of a third embodiment of a streaming server of the invention.
Figure 10:
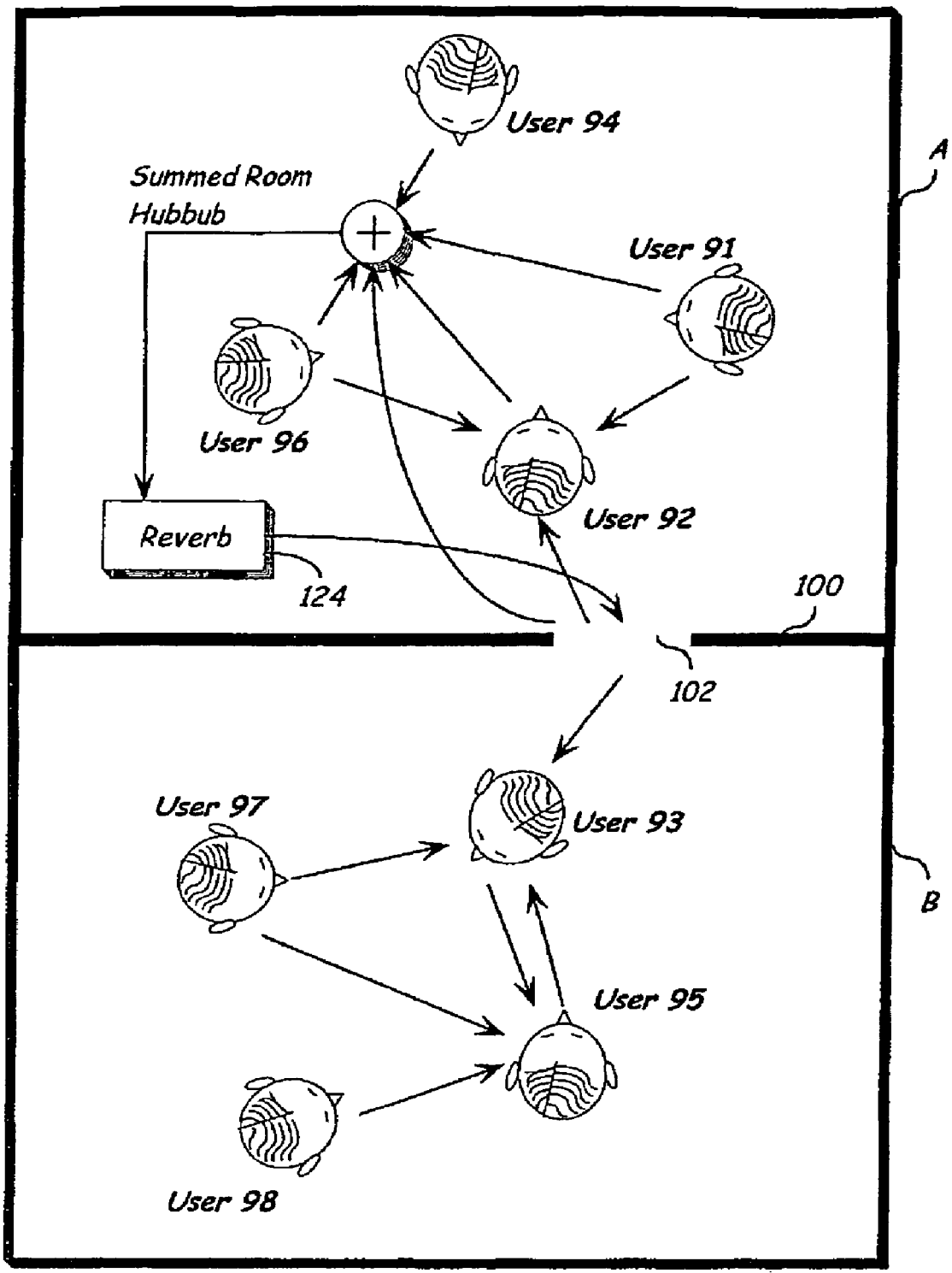
FIG. 10 illustrates a schematic view of a user interface screen which corresponds to the server configuration illustrated in FIG. 9.

In FIGS. 9 and 10, a more sophisticated version of a spatalized conversation system is illustrated. The audio component of the streaming server 82 comprises an audio bus 84 having source signal channels from eight users numbered from 91 to 98. In FIG. 10, a user interface screen is shown comprising chat rooms A and B divided by a wall 100 having an interleading doorway 102. Users 91, 92, 94 and 96 are located in room A, and users 93, 95, 97 and 98 are located in room B. The audio channels to and from the users 92, 93 and 95 are shown. Each of the users feeds his or her microphone signal into the server as a mono signal, as is shown at 104. Each of the users 92, 93 and 95 is fed with the three closest or chosen sources, including signals from other users or from the doorway 102. The summed room hubbub for room A is summed at 106, and includes audio channels from the users 91, 92, 94 and 96, together with a so-called "wet room" signal 108 from room B. This signal is made up of the signals from the users 93, 95, 97 and 98 which are summed at 110, together with the "wet room" signal 112 from room A. The directly summed output signal 116 from the summer 110 constitutes a "dry room" signal for room B. The "dry room" signal for room B is fed through a mono-reverberator 118 to provide a "wet room" signal output 120 for room B. This is in turn fed into the summer 106 for room A. The directly summed output 122 from the summer 106 is a "dry room" signal in respect of room A, with the "dry room" signal being processed by a mono-reverberator 124 to become a wet room signal 126 for room A.

The user 95 thus has as inputs the closest three users 93, 97 and 98 in room B, as well as the summed room hubbub constituted by the dry room signal 116 for room B. The user 93, on the other hand, has as inputs the closest two users 97 and 95, together with a doorway signal 128 constituted by the "wet room" reverberated output 126 from room A. In addition, user 93 in room B receives as an input a dry room input 130 representative of the background noise or hubbub in room B.

The user 92 in room A receives as inputs voice channels from the closest two users 91 and 96, together with a doorway signal constituted by a "wet room" signal 132 from the "wet room" output 120 of room B, together with a "dry room" output signal 134 from room A representative of the background noise in that room.

An audio experience which is consistent with a dual chat room environment is achieved, in that users in one room which are close to the doorway receive "wet room" input from the other room as a dedicated input channel. For users further away from the doorway and the other room, a reduced input from the other room is still achieved by virtue of the feedback of "wet room" signals 108 and 112 which are combined at the respective summers 106 and 110. This feature gives the user the ability to hear distant hubbub transmitted through multiple rooms and doors, and to navigate by sound to find the room with the greatest level of audible activity.

The gain of the fed back door signals 108 and 112 may be modified at 138 depending on whether the door is partly or fully open or closed, thereby enhancing the realism of the chat room environment and selectively allowing or preventing eavesdropping, in particular where it is possible for one or more of the users to "close" or "open" doors.

Figure 11:
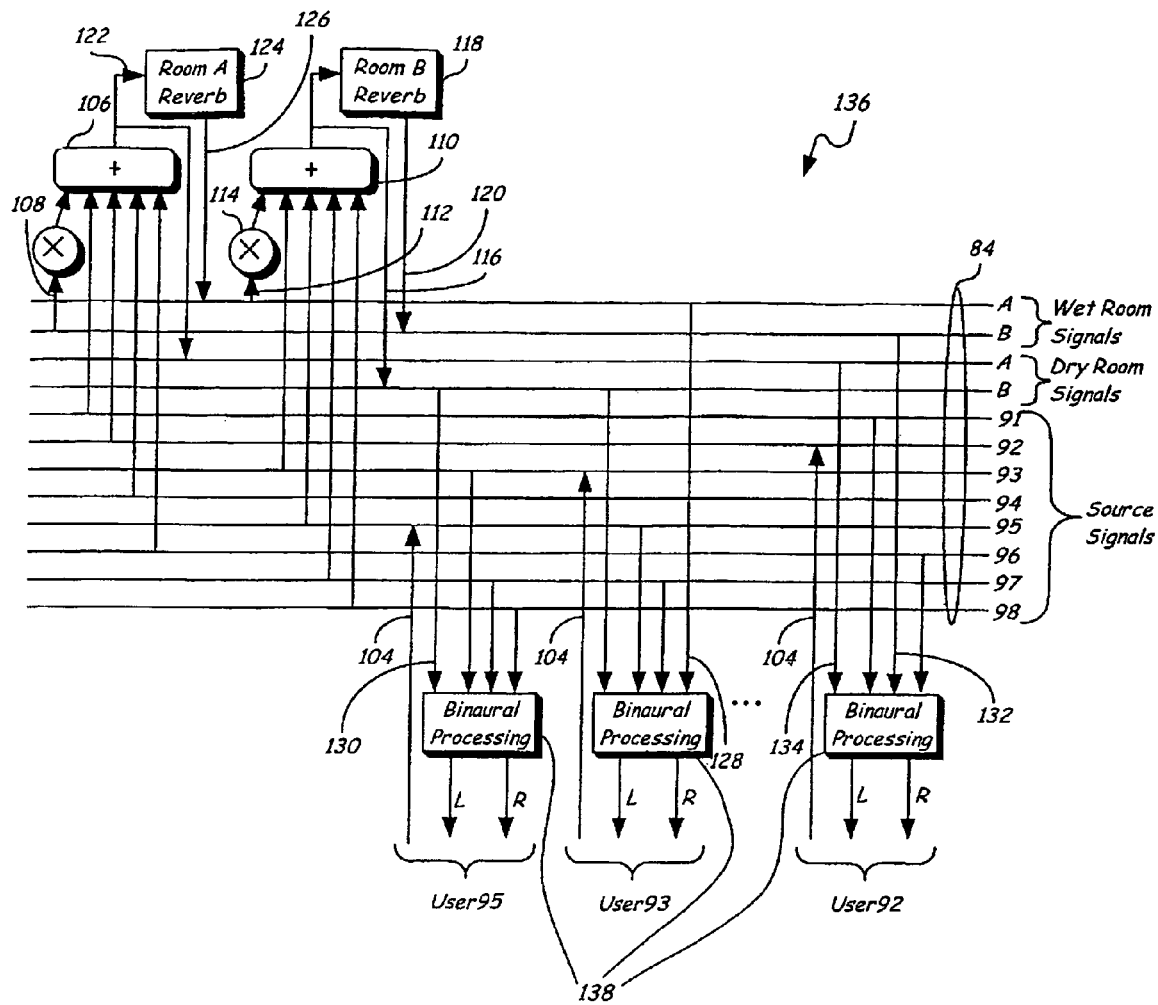
FIG. 11 shows a functional block diagram of an audio component of a fourth embodiment of a streaming server of the invention.

Referring now to FIG. 11, a further embodiment of a streaming server 136 is shown which is substantially identical to the FIG. 9 embodiment save that binaural processing is performed at the server. In particular, binaural processors 138 are provided for receiving and processing the various wet and dry room signals and the source signals. The user terminal-based binaural reverberation and HRTF processing shown in FIG. 8 can accordingly be arranged to take place at the server-based binaural processors 138. The L and R binaural signals from the server can thus be fed directly to the headphones of each of the users 92, 93 and 95, thereby reducing the hardware, signal processing and network bandwidth requirements at each of the user stations, in that only two input audio channels are required.

It will be appreciated that, in the case of HRTF processing user orientation and position on the graphic display on the user's screen 2 may be governed by a joystick or mouse pointer 1, as has previously been described. The position and orientation signals are transmitted to the streaming server for processing, inter alia, at the binaural processors, and may be augmented by head tracking signals to achieve a more realistic effect as the user rotates his or her head to address other individuals in the group. The head tracking signals derived from a head tracking unit may be used intuitively to effect both rotational and translational motion of the user representation by corresponding head rotation and translation. This may be supplemented by the mouse pointer 4 or joystick. The resultant orientation and positional signals may be transmitted back to the streaming server for processing, and may also be processed locally at the user terminal to achieve the desired spatialization effects.

It will be understood that the invention disclosed and defined herein extends to all alternative combinations of two or more of the individual features mentioned or evident from the text or drawings. All of these different combinations constitute various alternative aspects of the invention.

The foregoing describes embodiments of the present invention and modifications, obvious to those skilled in the art can be made thereto, without departing from the scope of the present invention.

The invention claimed is:

1. An interactive spatialized audiovisual system for linking a plurality of remote user terminals, the system comprising:
   a processing system coupled to a network; and
   an associated user database coupled to or part of the processing system, the user database including user data, including user status information for each corresponding user,
   wherein the processing system is configured to:
   receive a plurality of audio streams and associated locating data from the remote user terminals each audio stream corresponding to a user as a source of audio, the locating data for virtually locating the users relative to one another within a virtual user environment;
   select at least one group of at least one of the plurality of audio streams based on status information in the user database, each group corresponding to one of the users,
   combine at least some of the plurality of audio streams to form a combined stream, and
   send to each of at least one of the remote user terminals via the network the respective selected group of audio streams and associated locating data corresponding to the user of the remote user terminal, and
   send to the at least one of the remote user terminals via the network a function of the combined stream; the function possibly user dependent,
   wherein, a particular remote user terminal coupled to the network and corresponding to a particular user is configured to:
   receive the sent group of audio streams and the function of the combined stream;
   display a visual representation of the virtual user environment, including representations of at least some of the users; and
   convert the audio streams of the group corresponding to the particular user and the function of the combined stream to a pair of audio headphones signals including binauralized reverberant signals generated according to the combined stream,
   wherein the converting includes spatializing the audio streams of the group such that the particular user, listening to the headphone signals over headphones, has the sensation that the audio streams of the group are emanating from their respective user locations in the virtual user environment relative to the location of the particular user,
   wherein the spatializing includes HRTF processing to take into account the orientation and location of the particular user in the virtual user environment, and to take into account direct sounds and early echoes, and reverberation according to a non-spatial combination of audio streams.

2. A system according to claim 1, wherein the processing system is further configured to carry out at least part of the converting of the audio streams of each group of audio streams.

3. A system according to claim 1, wherein the processing system is further configured to spatialize a reverberantly processed version of the combined stream such that the particular user listening to the headphone signals over headphones perceives a reverberant background formed from the combined stream.

4. A system according to claim 1, wherein at least part of the spatializing occurs at the processing system such that the sending of a group of audio streams to the particular user is in at least a partially spatialized form.

5. A system according to claim 1, wherein the user status information used in the selecting the group to send to a particular user includes one or more of user location data which serves to locate the particular user in the virtual environment, user orientation data which serves to orientate the particular user both with respect to the other users and to the virtual environment, user listening status information for the particular user, and/or user talking status information for the particular user.

6. A system according to claim 5, wherein the user listening status information used in the selecting the group to send to a particular user is arranged to allow the particular user to listen to other selected users or groups of users in the environment.

7. A system according to claim 5, wherein the selecting of a group of a particular number of one or more audio streams to send to a particular user includes selecting the closest particular number of other users within the virtual environment.

8. A system according to claim 5, wherein the selecting of a group of a particular number of one or more audio streams to send to a particular user includes selecting the loudest particular number of sources based on at least one of the amplitude of the audio in the audio stream and/or the distance of the source of the audio stream from the particular user within the virtual environment.

9. A system according to claim 5, wherein the selecting of a group of a particular number of one or more audio streams to send to a particular user includes selecting according to input from the particular remote user terminal or from other remote user terminals.

10. A system according to claim 5, wherein the selecting of a group of a particular number of one or more audio streams to send to a particular user includes selecting according to input from a moderator able to control the talking and listening status of the users.

11. A system according to claim 5, wherein the virtual environment has one or more geographical or topological features arranged to affect the listening capability of users in the virtual environment and wherein the selecting of a group of a particular number of one or more audio streams to send to a particular user includes selecting based on the geographical or topological features.

12. A system according to claim 11, wherein the one or more features include one or more bafflers defining—two or more chat rooms, wherein at least some of the audio streams in a particular room are summed and spatialized and wherein reverberation processing is performed to achieve a background reverberation effect characteristic of that particular room.

13. A system according to claim 11, wherein the processing system is further configured to combine the audio streams in adjoining rooms or areas that have an entrance or exit in the virtual environment of the particular room or area where the particular user is located so as to create an adjoining room signal located at the entrance or exit, wherein the adjoining room signal is representative of the combined noise emanating from the room or area adjoining the particular room or area at the entrance or exit 14. A system according to claim 13, wherein the processing system is further configured to generate for the particular room or area an in-room signal representative of the background due to audio streams emanating from users within the particular room or area and optionally including a weighted reverberant version of any adjoining room signal emanating from users in any room adjoining the particular room or area, wherein sais generating includes combining the audio streams emanating from users within the particular room or area and optionally a weighted reverberant version of the combined signals emanating from users in the room or rooms or area or areas adjoining the particular room or area.

15. A system according to claim 13, wherein the processing system is further configured to generate for the particular room or area a room signal representative of a reverberant version of the adjoining room signal formed as a combining of the signals emanating from users in the room adjoining the particular room or area.

16. A method of operating a processing system in communication with a plurality of remote user terminals comprising:
    receiving a plurality of audio streams and associated locating data, each audio stream corresponding to a user as a source of audio, the locating data capable of virtually locating the audio sources relative to one another within a virtual user environment;
    determining user status data for one or more of the users;
    selecting at least one group of at least one of the plurality of audio streams based on the user status data, each group corresponding to one of the users;
    combining at least some of the plurality of audio streams to form a combined stream; and
    transmitting to each of at least one of the remote user terminals the respective selected group of audio streams and associated locating data corresponding to the user of the remote user terminal; and
    transmitting to the at least one of the remote user terminals a function of the combined stream; the function possibly user dependent,
wherein, a particular remote user terminal corresponding to a particular user is configured to:
    receive the transmitted group of audio streams and the function of the combined stream;
    display a visual representation of the environment, including representations of at least some of the users; and
    convert the audio streams of the group corresponding to the particular user and the function of the combined stream to a pair of audio headphones signals including binauralized reverberant signals generated according to the combined stream,
wherein the converting includes spatializing the audio streams of the group such that the particular user, listening the headphone signals over headphones, has the sensation that the audio streams of the group are emanating from their respective user locations in the virtual user environment relative to the location of the particular user, and
wherein the spatializing includes HRTF processing to take into account the orientation and location of the particular user in the virtual user environment, and to take into account the orientation and location of the particular user in the virtual user environment, and to take into account direct sounds and early echoes, and reverberation according to a non-spatial combination of audio streams,
wherein the combined stream is spatialized either before or after transmitting so as to provide a background audio effect within the virtual environment.

17. A method according to claim 16, further comprising repeating the determining and the selecting steps to allow for the case that the user status data is altered.

18. A method according to claim 16, wherein the virtual environment has one or more barriers defining two or more rooms or areas, the method further comprising:
    combining the audio streams in adjoining rooms or areas that have an entrance or exit in the virtual environment of the particular room or area where the particular user is located so as to create an adjoining room signal located at the entrance or exit, wherein the adjoining room signal is representative of the combined noise emanating from the room or area adjoining the particular room or area at the entrance or exit.

19. A method according to claim 18, further comprising:
generating for the particular room or area in the virtual user environment an in-room signal representative of the background due to audio streams emanating from users within the particular room or area and optionally including a weighted reverberant version of the adjoining room signal emanating from users in any room adjoining the particular room or area, wherein said generating includes combining the audio streams emanating from users within the particular room or area and optionally a weighted reverberant version of the combined signals emanating from users in the room or rooms or area or areas adjoining the particular room or area.

20. A method according to claim 18, wherein the combining the audio streams in adjoining rooms or areas includes generating for the particular room or area a room signal representative of a reverberant version of combination of the signals emanating from users in the room adjoining the particular room or area.

21. A user terminal for participating in a spatialized conversation in a network environment, the user terminal coupled to a computer network capable of streaming audio streams and associated spatialization information to the user terminal, the user terminal comprising:
a rendering system configured to:
  accept a selected group of audio streams selected from a plurality of audio streams, each stream corresponding to a user at a user location in a virtual user environment;
  accept associated locating data for virtually locating the users associated with the group's audio streams relative to one another within the virtual user environment,
  accept a function of a combined stream formed by combining at least some of the plurality of audio streams; and
  convert the audio streams of the group and the function of the combined stream to a pair of audio headphones signals including binauralized reverberant signals generated according to the combined stream,
  wherein the converting includes spatializing the audio streams of the group such that the particular user, listening to the headphone signals over headphones, has the sensation that the audio streams of the group are emanating from their respective user locations in the virtual user environment relative to the location of the particular user; and
a user interface including a display configured to present a visual representation of the virtual user environment, including representations of at least some of the users, wherein the spatializing by the rendering system includes HRTF processing to take into account the orientation and location of the particular user in the virtual user environment, and to take into account direct sounds and early echoes, and reverberation according to a non-spatial combination of audio streams.

22. A user terminal according to claim 21, wherein the virtual environment has one or more barriers defining two or more rooms or areas, wherein the particular user is located in the virtual environment in a particular room or area that—has an adjoining room or area that has an entrance or exit—to the particular room or area, wherein the rendering system is further configured to accept an adjoining room signal located at the entrance or exit, and wherein the adjoining room signal is representative of the combined noise emanating from the room or area adjoining the particular room or area at the entrance or exit.

23. A user terminal according to claim 22, wherein the rendering system is configured to receive an in-room signal representative of the background due to audio streams emanating from users within the particular room or area and optionally including a weighted reverberant versions of any adjoining room signal emanating from users in any room or area adjoining the particular room or area, wherein the in-room signal is formed by a process that includes combining the audio streams emanating from users within the particular room or area and optionally a weighted reverberant version of the combined signals emanating from users in the room or area or rooms or—areas adjoining the particular room or area.

24. A user terminal according to claim 22, wherein the adjoining room signal is formed by a process that includes combining the audio streams in adjoining rooms or areas including generating for the particular room or area a room signal representative of a reverberant version of combination of the signals emanating from users in the room adjoining the particular room or area.

25. A computer-readable medium having stored thereon executable instructions that when executed by one or more processors of a processing system in communication with a plurality of remote user terminals, cause implementing a method comprising:
receiving a plurality of audio streams and associated locating data, each audio stream corresponding to a user as a source of audio, the locating data capable of virtually locating the audio sources relative to one another within a virtual user environment;
determining user status data for one or more of the users;
selecting at least one group of at least one of the plurality of audio streams based on the user status data, each group corresponding to one of the users;
combining at least some of the plurality of audio streams to form a combined stream; and
transmit transmitting to each of at least one of the remote user terminals the respective selected group of audio streams and associated locating data corresponding to the user of the remote user terminal; and
transmitting to the at least one of the remote user terminals a function of the combined stream; the function possibly user dependent,
wherein, a particular remote user terminal corresponding to a particular user is configured to:
  receive the transmitted group of audio streams and the function of the combined stream;
  display a visual representation of the environment, including representations of at least some of the users; and
  convert the selected audio streams of the group corresponding to the particular user and the function of the combined stream to a pair of audio headphones signals, including binauralized reverberant signals generated according to the combined stream,
wherein the converting includes spatializing the audio streams of the group such that the particular user, listening the headphone signals over headphones, has the sensation that the audio streams of the group are emanating from their respective user locations in the virtual user environment relative to the location of the particular user, and
wherein the spatializing includes HRTF processing to take into account the orientation and location of the particular user in the virtual user environment, and to take into account direct sounds and early echoes, and reverberation according to a non-spatial combination of audio streams, wherein the combined stream is spatialized either before or after transmitting so as to provide a background audio effect within the virtual environment.

26. A computer-readable medium according to claim 25, wherein the virtual environment has one or more bafflers defining two or more rooms or areas, wherein the method further comprises combining the audio streams in adjoining rooms or areas that have an entrance or exit in the virtual user environment f the particular room or area where the particular user is located so as to create an adjoining room signal located at the entrance or exit, and wherein the adjoining room signal is representative of the combined noise emanating from the room or area adjoining the particular room or area at the entrance or exit.

27. A method of operating a particular user terminal that is part of an interactive spatialized audio facility including a networked computer and a plurality of user terminals linked to the networked computer, including the particular user terminal, the method comprising:
   transmitting from the particular user terminal to the networked computer an audio stream generated by a particular user and associated locating data capable of virtually locating the source of the audio stream generated by the user within a virtual environment, such that the networked computer can select groups of audio streams corresponding to each user, selectively combine at least some of the audio streams, for each group select associated locating data for the sources of the audio streams in the group, wherein the selecting is according to user status data available at the networked computer;
   receiving at the particular user terminal a particular selected group of a plurality of audio streams selected on the basis of the user status data for the particular user, and further receiving associated locating data for virtually locating the sources of the group's audio streams relative to one another within a virtual user environment;
   receiving at the particular user terminal a function of a combined audio stream formed by combining at least some of the plurality of audio streams corresponding to the users;
   generating at the particular user terminal visual representations of the sources of the audio streams to indicate virtual locations of the sources in the virtual user environment, and
   converting the selected group of audio streams and the function of the combined stream to a pair of audio headphones signals including binauralized reverberant signals generated according to the combined stream,
wherein the converting includes spatializing the audio—streams of the group such that the particular user, listening to the headphone signals over headphones, has the sensation that the audio streams of the selected group are emanating from their respective user locations in the virtual user environment relative to the location of the particular user, and, wherein the spatializing includes HRTF processing to take into account the orientation and location of the particular user in the virtual user environment, and to take into account direct sounds and early echoes, and reverberation according to a non-spatial combination of audio streams.

28. A method according to claim 27, wherein the virtual environment has one or more barriers defining two or more rooms or areas, and wherein the particular user is located in the virtual environment in a particular room or area that includes an adjoining room that has an entrance or exit in the virtual user environment, the method further comprising receiving at the user terminal an adjoining room signal representative of the combined noise emanating from the room or area adjoining the particular room or area and located at the entrance or exit between the particular room or area and the room or area adjoining the particular room or area.

29. A method according to claim 28, further comprising:
   receiving an in-room signal representative of the background due to audio streams emanating from users within the particular room or area and optionally including a weighted reverberant versions of any adjoining room signal emanating from users in any room or area adjoining the particular room or area, wherein the in-room signal is formed by a process that includes combining the audio streams of the users emanating from users within the particular room or area and optionally a weighted reverberant version of the combined signals emanating from users in the room or area or rooms or areas adjoining the particular room or area.

30. A computer-readable medium having stored thereon executable instructions that when executed by a processor in a particular user terminal, cause carrying out of a method of operating the a particular user terminal, the user terminal being part of an interactive spatialized audio facility including a networked computer and a plurality of user terminals linked to the networked computer, including the particular user terminal, the method comprising:
   transmitting from the particular user terminal to the networked computer an audio stream generated by a particular user and associated locating data capable of virtually locating the source of the audio stream generated by the user within a virtual environment, such that the networked computer can select groups of audio streams corresponding to each user, selectively combine at least some of the audio streams, for each group select associated locating data for the sources of the audio streams in the group, wherein the selecting is according to user status data available at the networked computer;
   receiving at the particular user terminal a particular selected group of a plurality of audio streams selected on the basis of the user status data for the particular user, and further receiving associated locating data for virtually locating the sources of the group's audio streams relative to one another within a virtual user environment;
   receiving at the particular user terminal a function of a combined audio stream formed by combining at least some of the plurality of audio streams corresponding to the users;
   generating at the particular user terminal visual representations of the sources of the audio streams to indicate virtual locations of the sources in the virtual user environment, and
   converting the selected group of audio streams and the function of the combined stream to a pair of audio headphones signals including binauralized reverberant signals generated according to the combined stream,
wherein the converting includes spatializing the audio—streams of the group such that the particular user, listening to the headphone signals over headphones, has the sensation that the audio streams of the selected group are emanating from their respective user locations in the virtual user environment relative to the location of the particular user, and, wherein the spatializing includes HRTF processing to take into account the orientation and location of the particular user in the virtual user environment, and to take into account direct sounds and early echoes, and reverberation according to a non-spatial combination of audio streams.

31. A system according to claim 5, wherein the selecting of a group of a particular number of one or more audio streams to send to a particular user includes selecting according to one or more of the criteria including:

selecting a number M of the audio streams corresponding to the M closest users from the total number N of audio streams, selecting the number M loudest audio streams based on the amplitude of the signal of the audio stream and/or the distance of the user corresponding to the audio stream from the particular user, selecting according to a user-driven selection process determined by the particular user or one—or more other users, selecting according to a moderator-driven selection process in which a "moderator" in the environment is able to control the talking and listening status of the other users, and/or selecting based on the geography or topology of the virtual environment, in which features of the environment are arranged realistically to affect the listening capability of users in the environment, so as to provide a coherent visual and sonic landscape.

32. A computer-readable medium according to claim 26, wherein the method further comprises:

generating for the particular room or area in the virtual user environment an in-room signal representative of the background due to audio streams emanating from users within the particular room or area and optionally including a weighted reverberant version of the adjoining room signal emanating from users in any room adjoining the particular room or area, wherein said generating includes combining the audio streams emanating from users within the particular room or area and optionally a weighted reverberant version of the combined signals emanating from users in the room or rooms or area or areas adjoining the particular room or area.

33. A computer-readable medium according to claim 26, wherein the combining the audio streams in adjoining rooms or areas includes generating for the particular room or area a room signal representative of a reverberant version of combination of the signals emanating from users in the room adjoining the particular room or area.

34. A method according to claim 28, wherein the adjoining room signal is formed by a process that includes combining the audio streams in adjoining rooms or areas including generating for the particular room or area a room signal representative of a reverberant version of combination of the signals emanating from users in the room adjoining the particular room or area.

35. A computer readable medium according to claim 30, wherein the virtual environment has one or more barriers defining two or more rooms or areas, wherein the particular user is located in the virtual environment in a particular room or area that includes an adjoining room or area that has an entrance or exit in the virtual user environment, wherein the rendering system is further configured to accept an adjoining room signal located at the entrance or exit, and wherein the adjoining room signal is representative of the combined noise emanating from the room or area adjoining the particular room or area at the entrance or exit.

36. A computer readable medium according to claim 35, wherein the method further comprises:

receiving an in-room signal representative of the background due to audio streams emanating from users within the particular room or area and optionally including a weighted reverberant versions of any adjoining room signal emanating from users in any room or area adjoining the particular room or area, wherein the in-room signal is formed by a process that includes combining the audio streams emanating from users within the particular room or area and optionally a weighted reverberant version of the combined signals emanating from users in the room or area or rooms or—areas adjoining the particular room or area.

37. A computer readable medium according to claim 35, wherein the adjoining room signal is formed by a process that includes combining the audio streams in adjoining rooms or areas including generating for the particular room or area a room signal representative of a reverberant version of combination of the signals emanating from users in the room adjoining the particular room or area.

* * * * *